(12) United States Patent
Flick

(10) Patent No.: US 6,320,498 B1
(45) Date of Patent: Nov. 20, 2001

(54) VEHICLE SECURITY SYSTEM WITH SILENT ARMING AND/OR DISARMING AND ASSOCIATED METHODS

(76) Inventor: Kenneth E. Flick, 5236 Prasley Pl., Douglasville, GA (US) 30135

( * ) Notice: Subject to any disclaimer, the term of this patent is extended or adjusted under 35 U.S.C. 154(b) by 0 days.

(21) Appl. No.: 09/667,290

(22) Filed: Sep. 22, 2000

(51) Int. Cl.$^7$ ..................................................... B60Q 1/00
(52) U.S. Cl. ........................ 340/426; 340/425.5; 340/692
(58) Field of Search ................................. 340/425.5, 426, 340/692; 180/287; 307/10.1, 10.2

(56) References Cited

U.S. PATENT DOCUMENTS

| | | | |
|---|---|---|---|
| 5,382,941 | * 1/1995 | Arzoumanian | 340/426 |
| 5,534,845 | 7/1996 | Issa et al. | 340/425.5 |
| 5,543,776 | * 8/1996 | L'Esperance et al. | 340/426 |
| 5,572,185 | * 11/1996 | Chen et al. | 340/425.5 |
| 6,049,268 | * 4/2000 | Flick | 340/425.5 |

* cited by examiner

*Primary Examiner*—Edward Lefkowitz
(74) *Attorney, Agent, or Firm*—Allen, Dyer, Doppelt, Milbrath & Gilchrist, P.A.

(57) ABSTRACT

A vehicle security system can be armed and/or disarmed without sounding the chirp responsive to operation of an auxiliary switch on the remote transmitter two or more times within a predetermined time. The security system may include the remote transmitter including at least one first switch for transmitting at least one first signal, and a second switch for transmitting a second signal. The system may also include an audible indicator for sounding an audible indication, such as a chirp. The security controller is preferably switchable to an armed or disarmed mode responsive to receiving the at least one first signal, and will sound the audible indication as confirmation thereof. The security controller also preferably performs an auxiliary function responsive to receiving the second signal based upon the user operating the second switch continuously for greater than a predetermined time. The security controller also preferably toggles to an opposite one of the armed and disarmed modes without sounding the audible indication responsive to receiving the second signal based upon the user operating the second switch a plurality of times in less than the predetermined time.

39 Claims, 4 Drawing Sheets

VEHICLE SECURITY SYSTEM WITH SILENT ARMING AND/OR DISARMING AND ASSOCIATED METHODS

FIELD OF THE INVENTION

The present invention relates to the field of security systems, and, more particularly, to a vehicle security system and associated methods that permit silent arming and disarming via the remote transmitter.

BACKGROUND OF THE INVENTION

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may be used as sensors. In addition, radar sensors may be used to monitor the area proximate the vehicle.

The security controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition. A typical security system also includes a receiver associated with the controller. The receiver cooperates with one or more remote transmitters typically carried by the user and which are used to arm and disarm the vehicle security system, for example. Other remote control features, such as locking or unlocking vehicle doors may also be performed.

A typical security system switches from armed to disarmed modes responsive to the remote transmitter, and generates an audible chirp as confirmation to the user that the controller has changed modes or has at least received the signal to change modes. A synthesized voice message and/or a flashing of the vehicle lights may also accompany the chirp as confirmation. In some situations, it may be desirable to avoid the audible chirp, such as to avoid disturbing others in the vicinity of the vehicle, for example. This is generally described as "silent" arming or disarming.

A security system sold as the model AL-800 by a leading aftermarket vehicle security system provider, Omega Research & Development, of Douglasville Georgia, provided a version of this enhanced feature of selectable silent arming and disarming. The remote transmitter included an arm/disarm switch which when pressed rapidly twice in succession would cause silent toggling of the controller to the other mode. If pressed once for a normal length of time, that is, about one second, the normal toggling would occur with the audible confirmation chirp. If pressed longer than the fraction of a second, or if the first or subsequent transmission were not received, difficulties could arise in operating the silent arming and disarming. Difficulties can be due to outside radio interference causing an otherwise normal length signal to be received as two separated signals causing the unintentional toggling. Of course, two signals could be transmitted, but only one received due to interference.

Another somewhat more cumbersome approach to silent arming and disarming is disclosed in U.S. Pat. No. 5,534,845 to Issa et al. In this approach, the trunk release is pressed for less than a preset time of 2.5 seconds and then one of the separate arm or disarm switches on the remote transmitter is operated within a five second window for respective silent arming or disarming. Unfortunately, operating multiple switches in such a precise pattern may be difficult for some users. In addition, the user is not always confident that the first short trunk release pulse has been received by the controller. Accordingly, the audible confirmation chirp may be given even when undesired.

SUMMARY OF THE INVENTION

In view of the foregoing background, it is therefore an object of the present invention to provide a vehicle security system where selectable silent arming and/or disarming is simplified for the user, and is less likely to result in an inadvertent audible confirmation chirp.

This and other objects, features and advantages in accordance with the present invention are provided by a vehicle security system which can be armed and/or disarmed without sounding the chirp by operation of an auxiliary switch on the remote transmitter two or more times within a predetermined time. More particularly, the security system may include the remote transmitter to be carried by the user and including at least one first switch for transmitting at least one first signal, and a second switch for transmitting a second signal. The system may also include an audible indicator, such as a horn or siren, for sounding an audible indication. The security controller is preferably switchable to one of the armed and disarmed modes responsive to receiving the at least one first signal, and will sound the audible indication as confirmation thereof. In other words, the at least one first switch on the remote transmitter is for normal arming and/or disarming of the controller with the audible indication or chirp.

The security controller also preferably performs an auxiliary function responsive to receiving the second signal based upon the user operating the second switch continuously for greater than a predetermined time. Moreover, the security controller also preferably toggles to an opposite one of the armed and disarmed modes without sounding the audible indication responsive to receiving the second signal based upon the user operating the second switch a plurality of times in less than the predetermined time. The auxiliary function may be release of the trunk, and the predetermined time may be in a range of about two to three seconds, for example.

In slightly different terms, the second switch causes the auxiliary function only when held for greater than the predetermined time. In accordance with the present invention, this auxiliary switch is advantageously also used to provide the ability to silently arm or disarm the controller. Moreover, if the first transmission is not received for some reason, subsequent transmissions will still cause the controller to switch modes without sounding the audible indication.

The security controller may also have a timeout delay, such as in a range of about three to five seconds, after switching modes before being able to again switch modes. This reduces the likelihood of the controller switching more than once based upon multiple operations of the auxiliary switch.

Of course, the system may also include at least one security sensor for causing the security controller to generate an alarm when in the armed mode. The vehicle may also include headlights, and the security controller may operate the headlights responsive to switching between armed and disarmed modes. Alternately or additionally, the vehicle may comprise door locks also operated when the security controller switches between armed and disarmed modes. Accordingly, one or both of flashing of the headlights and movement of the door locks can provide confirmation to the user even when using the silent arming and disarming.

The remote transmitter and the security controller may use changing codes for increased security. In addition, the remote transmitter may include a housing carrying the at least one first switch and the second switch, and a transmitter carried by the housing and connected to the at least one first switch and the second switch.

A method aspect of the invention is for operating a vehicle security system comprising a remote transmitter to be carried by a user and including at least one first switch for transmitting at least one first signal, and a second switch for transmitting a second signal; an audible indicator for sounding an audible indication; and a security controller switchable to one of an armed mode and a disarmed mode. The method preferably comprises switching the security controller between one of the armed and disarmed modes responsive to receiving the at least one first signal and sounding the audible indication as confirmation thereof.

The method also preferably comprises using the security controller to perform an auxiliary function responsive to receiving the second signal based upon the user operating the second switch continuously for greater than a predetermined time. In addition, the method also preferably includes toggling the security controller to an opposite one of the armed and disarmed modes without sounding the audible indication responsive to receiving the second signal based upon the user operating the second switch a plurality of times in less than the predetermined time.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used in an alternate embodiment.

Figure 1:
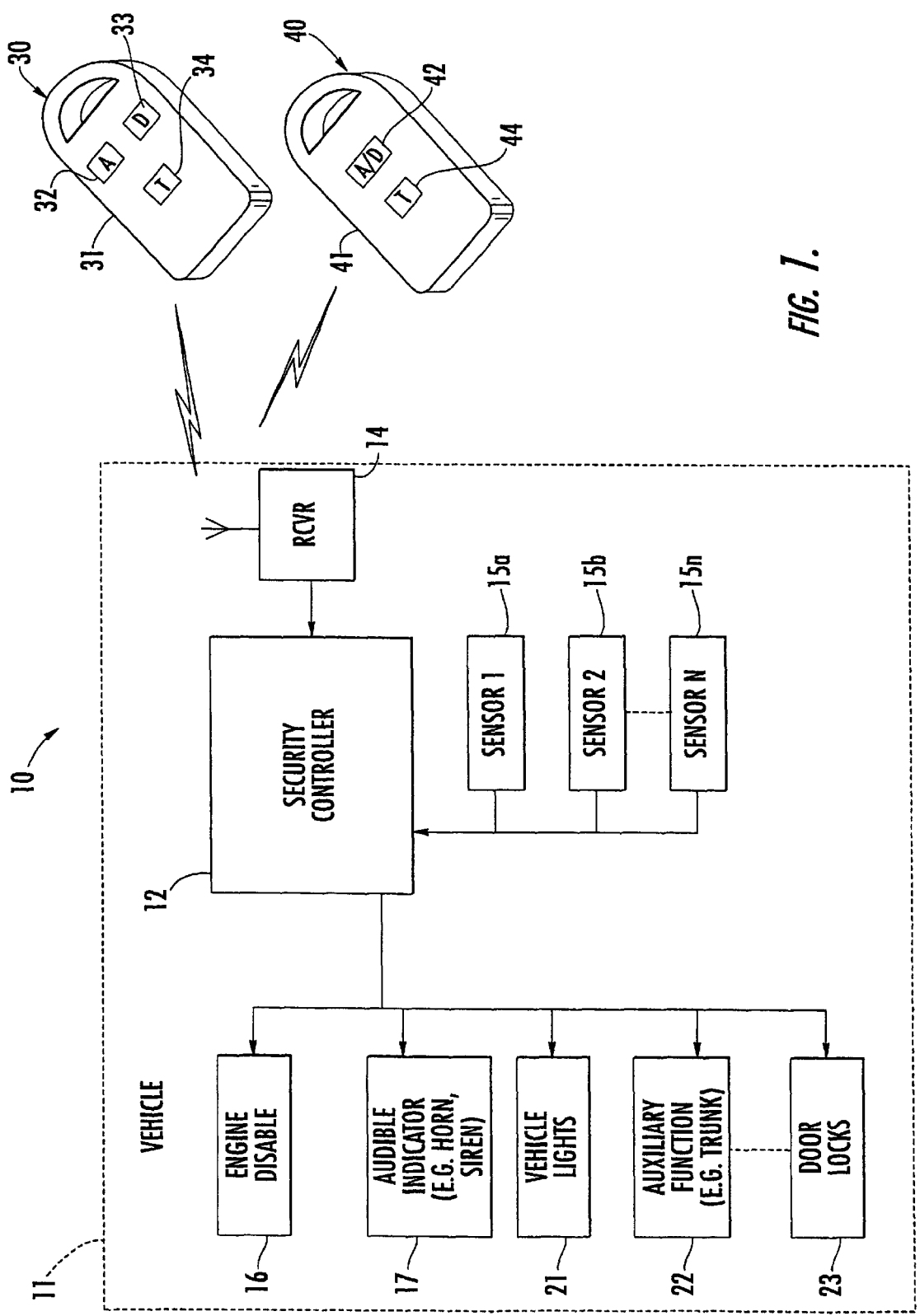
FIG. 1 is a schematic block diagram of a vehicle security system in accordance with the present invention.
Figure 2:
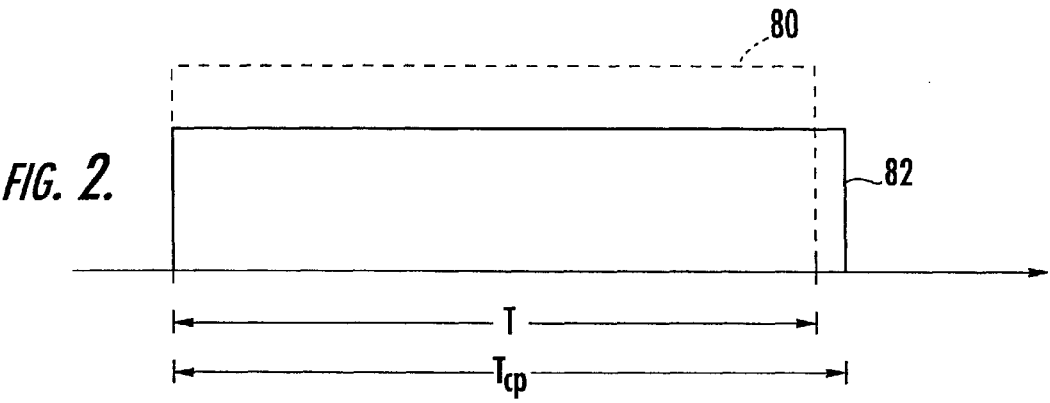
FIG. 2 is a timing diagram illustrating continuous operation of a trunk release switch on a remote transmitter as in FIG. 1 for greater than a predetermined time T.

Referring initially to FIG. 1, the basic components of a security system 10 in accordance with the invention are now described. The system 10 may include one or more remote transmitters 30, 40 to be carried by the user and including at least one first switch for transmitting at least one first signal, and a second switch for transmitting a second signal. More particularly, the illustrated upper remote transmitter 30 includes a housing 31 which carries an arm button or witch 32, a disarm button or switch 33, and a trunk release button or switch 34. The lower remote transmitter 40 also includes a housing 41 which, in turn, carries an arm/disarm toggle button or switch 42 and a trunk release switch 44.

As will be appreciated by those skilled in the art, the housing 31, 41 would also typically contain a battery and suitable electronics for generating radio frequency (RF) transmissions. Such transmissions could also be via other wireless techniques. In addition, the transmission may be pseudorandomly coded, also called changing code, to reduce a likelihood of a code grabber being able to capture and replay a code to operate the system as will also be appreciated by those skilled in the art.

The system 10 also includes a security controller 12 at the vehicle 11 which may include a microprocessor and memory cooperating to perform the various monitoring and alerting features. The security controller 12 may be connected to the illustrated RF receiver 14. The security controller 12 is also connected to a number of security sensors 15a–15n, which may include door, trunk, and/or hood pin switches, as well as shock, proximity, or other types of sensors as will be understood by those skilled in the art. The security controller 12 monitors the sensors 15a–15n, and, if the security controller is in an armed mode, for example, a sensor 15a–15n may trigger an alarm indication at the vehicle. If the security controller 12 is in the disarmed mode, an alarm indication is not generated, and normal operation of the vehicle is typically permitted.

Of course, the security controller 12 may be switched between armed and disarmed modes to permit operation by the user (disarmed mode), and to protect the vehicle 11 when the user is away from the vehicle (armed mode). The remote transmitter 30, 40 may be used to switch the controller 12 between the armed and disarmed modes. In some embodiments, the security controller 12 may also include a passive arming feature which automatically arms the controller based upon the user exiting of the vehicle.

The security system 10 also includes an engine disable circuit or device 16 which can prevent or disable starting and/or running of the vehicle engine. This would typically be used when an alarm was triggered by one or more of the security sensors 15a–15n.

An audible indicator 17, such as the vehicle horn or a siren, is also illustratively connected to the security controller 12. The audible indicator 17 is used to sound an alarm condition, for example, but is also used to provide an audible indication that the controller has been commanded or has already changed modes. The audible confirmation indication is usually of short duration and/or amplitude and is typically known as a confirmation chirp.

Vehicle lights 21 are also illustratively connected to the security controller 12. The lights 21 may be flashed during an alarm indication. In addition, the lights 21 may also be flashed along with the confirmation chirp when the controller 12 is switched between armed and disarmed modes. For example, one audible chirp and light flash may be given to confirm that the controller 12 has been switched to the armed mode. Two flashes and chirps may be used to indicate that the controller 12 has been disarmed. Other combinations are also possible as will be appreciated by those skilled in the art.

An auxiliary function device 22, such as a trunk release solenoid or mechanism, is also illustratively connected to the controller 12. For clarity of explanation, the auxiliary function will be described primarily herein as the trunk release, although those of skill in the art will recognize that other auxiliary-type functions are also contemplated by the present invention. The user can operate the trunk release 22 remotely from the trunk release button or switch 34, 44. Receipt of the proper trunk release signal may also cause an audible indication, if this feature is selected.

In the illustrated embodiment, power door locks 23 may also be connected to the security controller 12. For example, the controller 12 could cause the power door locks to move to the unlocked position when the user returns to the vehicle 11 and switches the controller to the disarmed mode. Conversely, the controller 12 could move the door locks to the locked position, upon the user switching the controller 12 to the armed mode.

Figure 4:
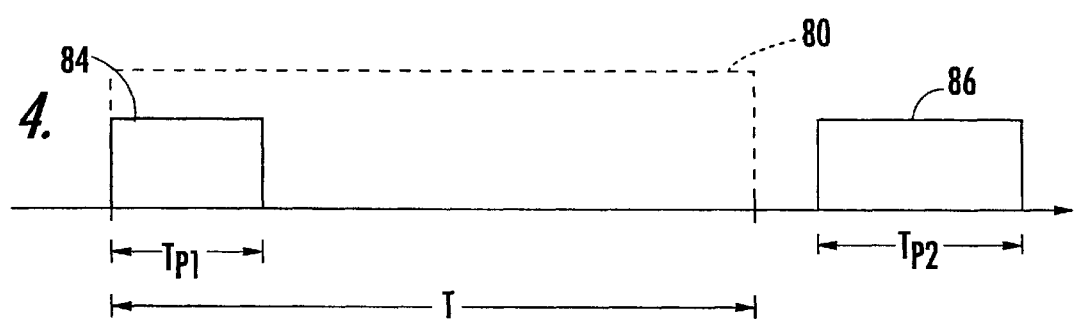
FIG. 4 is a timing diagram illustrating operation of a trunk release switch on a remote transmitter as in FIG. 1 for two times in greater than the predetermined time T.
Figure 5:
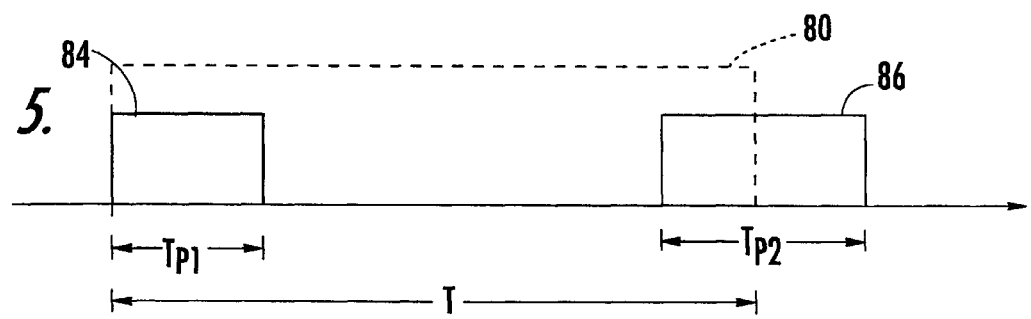
FIG. 5 is a timing diagram illustrating operation of a trunk release switch on a remote transmitter as in FIG. 1 for two times and with the second operation starting before expiration of the predetermined time T and ending after time T.
Figure 6:
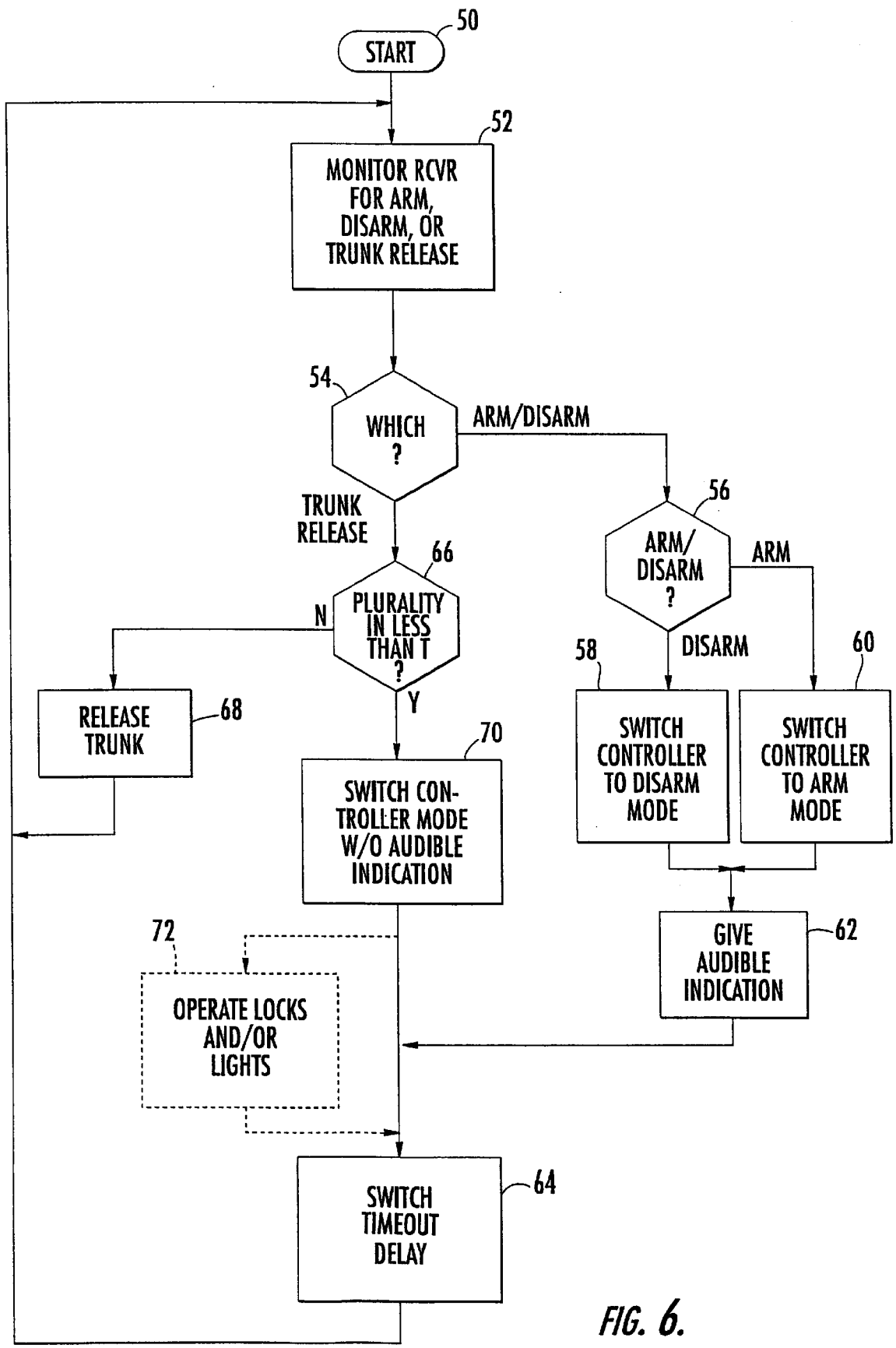
FIG. 6 is a flow chart illustrating operation of the security system as shown in FIG. 1 with a remote transmitter having individual arm and disarm switches.

Referring now additionally to the exemplary timing diagrams of FIGS. 2–5, and the flow chart of FIG. 6, operation of the vehicle security system 10 based upon the signals from the remote transmitter 30 having the separate arm switch 32 and disarm switch 33 is explained. From the start (Block 50) the controller 12 monitors the receiver 14 for an arm signal, a disarm signal, or a trunk release signal at Block 52. The signal actually received by the may be a single coded signal or multiple coded signals that are produced by pressing or operating the respective switch.

At Block 54 it is determined which signal has been received, and if it is one of the armed and disarmed signals as further determined at Block 56, then the controller is switched to either the armed mode (Block 58) or the disarmed mode (Block 60). A respective audible indication is also given at Block 62, such as in the form of one or more audible chirps from the audible indicator 17. A timeout delay of about 5 seconds, for example, can be implemented (Block 64) before permitting another change of the controller's mode. This may prevent undesired rapid switching of the controller's mode as will be appreciated by those skilled in the art.

If the signal received as determined at Block 54 is the trunk release signal, then it is determined if the signal is representative of continuous pressing of the trunk release switch 34 on the remote transmitter 30 for greater than a predetermined time T. This corresponds to the timing diagram of FIG. 2, wherein the predetermined time T is shown as a dashed window 80 which starts upon receipt of the signal and which terminates prior to the trunk release switch 34 being released by the user. In other words, if the trunk release switch 34 is held for longer than time T, the trunk release will be performed (Block 68).

Figure 3:
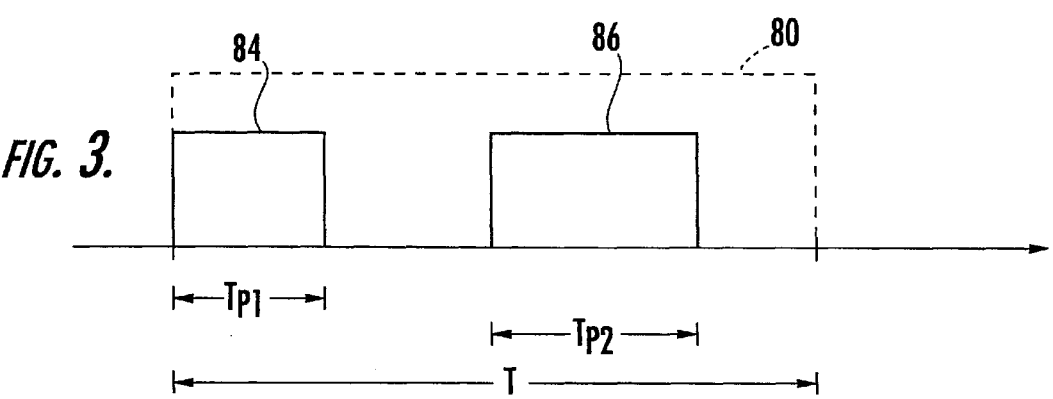
FIG. 3 is a timing diagram illustrating operation of a trunk release switch on a remote transmitter as in FIG. 1 for two times in less than the predetermined time T.

As shown in FIG. 3, if the trunk release switch 34 is pressed twice quickly in the pattern shown by the first and second pulses 84, 86, and these pulses are within the predetermined time T as illustrated by the dashed window 80, then the security controller 12 is toggled to the opposite mode from its current mode at Block 70. In addition, this mode switching at Block 70 is done silently, that is, without the audible indication, such as one or more chirps. Accordingly, the user, if desired, can readily and easily switch the controller 12 without generating a potentially intrusive audible indication. As will be appreciated by those skilled in the art, in some embodiments, the user may alternately rely on the flashing of the lights 21 or the operation of the vehicle door locks 23 (Block 72) instead of the chirp(s) for confirmation of the security controller 12 being switched.

As shown in the timing diagram of FIG. 4, two operations of the trunk release switch are determined as shown by the two pulses 84, 86; however, the second pulse is fully outside of the window 80. Accordingly, the security controller 12 will take no action. This type of operation may occur from random contact in the pocket of a user, for example, and unintentional switching of the controller or opening of the trunk is thereby avoided.

In the timing diagram of FIG. 5, the second pulse 86 begins prior to the end of the window 80, but extends past the end of the window. In this scenario, the system 10 could be configured to switch the controller, if desired, or to perform no function, if desired. In other words, the leading edge, trailing edge of some other portion of the second pulse 86 could be compared to the end of the window 80 to cause the silent switching of the security controller 12 at Block 70.

The predetermined time T, or width of the window 80 can be in a range of about 2 to 3 seconds, for example, although other time durations are also possible. In addition, although only two pulses 84, 86 are shown for the plurality of trunk release switch 34b operations, three or more could also be used. In fact, continuous rapid pressing of the trunk release switch 34 would be very likely to correctly operate the silent controller switching feature of the invention even in the presence of interference. This is so since if one or more pulses were not received, any two in quick succession would cause the security controller 12 to switch. In addition, once the controller 12 switched, the timeout delay (Block 64) would prevent further unintended rapid switching. The timeout delay may be in the range of about 3 to 5 seconds, for example. Thus, the security system 10 of the present invention provides a number of significant ease and reliability-of-use advantages over prior security systems including a silent arm/disarm feature.

Figure 7:
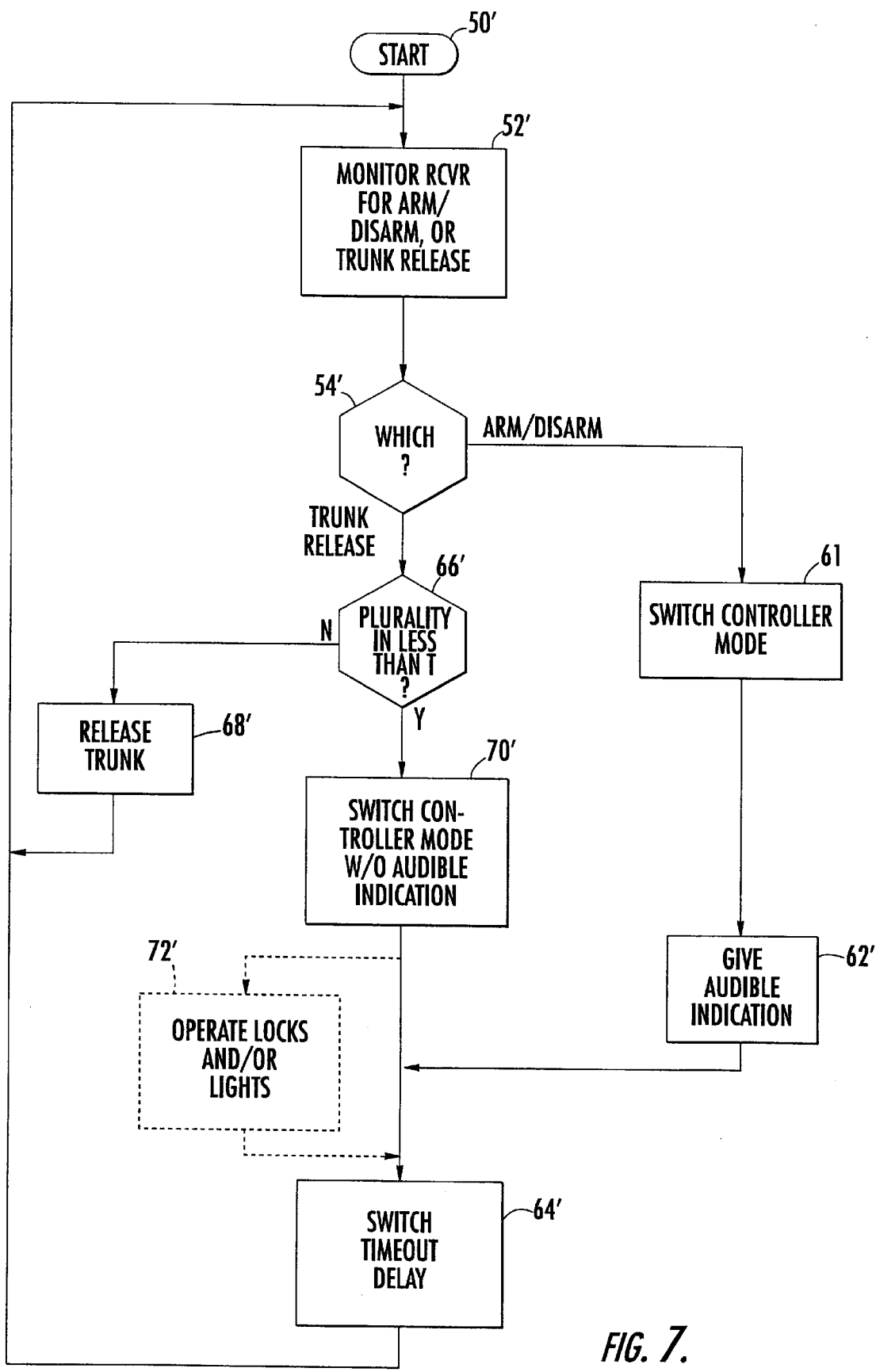
FIG. 7 is a flow chart illustrating operation of the security system as shown in FIG. 1 with a remote transmitter having a combined arm/disarm switch.

Referring now lastly to the flow chart of FIG. 7, another variation of the invention is explained. In this variation, the remote transmitter 40 being used has a single switch 42 for toggling the security controller 12 to the opposite one of the armed or disarmed mode from the current mode. This is illustrated at Block 61 wherein the controller mode is toggled upon receipt of signals representative of pressing the arm/disarm switch 42 as will be appreciated by those skilled in the art. The other Blocks indicated with prime notation are similar to their counterparts described above with respect to FIG. 6. Accordingly, these need no further discussion herein.

In the illustrated embodiments, the trunk release has been used as the example of the auxiliary function. Those of skill in the art will appreciate that the present invention is readily applicable to other auxiliary functions. Accordingly, many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the appended claims.

That which is claimed is:

1. A vehicle security system comprising:
   a remote transmitter to be carried by a user and comprising at least one first switch for transmitting at least one first signal, and a second switch for transmitting a second signal;
   an audible indicator for sounding an audible indication; and
   a security controller switchable to one of an armed mode and a disarmed mode responsive to receiving the at least one first signal and sounding the audible indication as confirmation thereof, said security controller performing an auxiliary function responsive to receiving the second signal based upon the user operating the second switch continuously for greater than a predetermined time, said security controller toggling to an opposite one of the armed and disarmed modes without sounding the audible indication responsive to receiving the second signal based upon the user operating the second switch a plurality of times in less than the predetermined time.

2. A vehicle security system according to claim 1 wherein said at least one first switch comprises an arm switch for switching said security controller to the armed mode, and a disarm switch for switching said security controller to the disarmed mode.

3. A vehicle security system according to claim 1 wherein said at least one first switch comprises an arm/disarm switch for toggling said security controller to an opposite one of the armed and disarmed modes.

4. A vehicle security system according to claim 1 wherein the predetermined time is in a range of about two to three seconds.

5. A vehicle security system according to claim 1 wherein said security controller has a timeout delay after switching modes before being able to again switch modes.

6. A vehicle security system according to claim 5 wherein the timeout delay is in a range of about three to five seconds.

7. A vehicle security system according to claim 1 wherein the vehicle includes a releasable trunk; and wherein the auxiliary function comprises release of the trunk.

8. A vehicle security system according to claim 1 further comprising at least one security sensor for causing said security controller to generate an alarm when in the armed mode.

9. A vehicle security system according to claim 1 wherein the vehicle comprises headlights; and wherein said security controller operates the headlights responsive to switching between armed and disarmed modes.

10. A vehicle security system according to claim 1 wherein the vehicle comprises door locks; and wherein said security controller operates the door locks responsive to switching between armed and disarmed modes.

11. A vehicle security system according to claim 1 wherein said remote transmitter and said security controller use changing codes for increased security.

12. A vehicle security system according to claim 1 wherein said remote transmitter comprises a housing carrying said at least one first switch and said second switch, and a transmitter carried by said housing and connected to said at least one first switch and said second switch.

13. A vehicle security system comprising:
    a remote transmitter to be carried by a user and comprising an arm switch for transmitting an arm signal, a disarm switch for transmitting a disarm signal, and a trunk release switch for transmitting a trunk release signal;
    an audible indicator for sounding an audible indication; and
    a security controller switchable to one of an armed mode and a disarmed mode responsive to receiving a respective one of the arm and disarm signals and sounding the audible indication as confirmation thereof, said security controller performing a trunk release based upon the user operating the trunk release switch continuously for greater than a predetermined time, said security controller toggling to an opposite one of the armed and disarmed modes without sounding the audible indication responsive to receiving the trunk release signal based upon the user operating the trunk release switch a plurality of times in less than the predetermined time.

14. A vehicle security system according to claim 13 wherein the predetermined time is in a range of about two to three seconds.

15. A vehicle security system according to claim 13 wherein said security controller has a timeout delay after switching modes before being able to again switch modes.

16. A vehicle security system according to claim 15 wherein the timeout delay is in a range of about three to five seconds.

17. A vehicle security system according to claim 13 further comprising at least one security sensor for causing said security controller to generate an alarm when in the armed mode.

18. A vehicle security system according to claim 13 wherein the vehicle comprises headlights; and wherein said security controller operates the headlights responsive to switching between armed and disarmed modes.

19. A vehicle security system according to claim 13 wherein said transmitter and said security controller use changing codes for increased security.

20. A vehicle security system according to claim 13 wherein said remote transmitter comprises a housing carrying said arm, disarm and trunk release switches; and a transmitter carried by said housing and connected to said arm, disarm and trunk release switches.

21. A vehicle security system comprising:
    a remote transmitter to be carried by a user and comprising an arm/disarm switch for transmitting an arm/disarm toggle signal, and a trunk release switch for transmitting a trunk release signal;
    an audible indicator for sounding an audible indication; and
    a security controller toggling to an opposite one of an armed mode and a disarmed mode responsive to receiving the arm/disarm toggle signal and sounding the audible indication as confirmation thereof, said security controller performing a trunk release responsive to receiving the trunk release signal based upon the user operating the trunk release switch continuously for greater than a predetermined time, said security controller toggling to an opposite one of the armed and disarmed modes without sounding the audible indication responsive to receiving the trunk release signal based upon the user operating the trunk release switch a plurality of times in less than the predetermined time.

22. A vehicle security system according to claim 21 wherein the predetermined time is in a range of about two to three seconds.

23. A vehicle security system according to claim 21 wherein said security controller has a timeout delay after switching modes before being able to again switch modes.

24. A vehicle security system according to claim 23 wherein the timeout delay is in a range of about three to five seconds.

25. A vehicle security system according to claim 22 further comprising at least one security sensor for causing said security controller to generate an alarm when in the armed mode.

26. A vehicle security system according to claim 21 wherein the vehicle comprises headlights; and wherein said security controller operates the headlights responsive to switching between armed and disarmed modes.

27. A vehicle security system according to claim 21 wherein said transmitter and said security controller use changing codes for increased security.

28. A vehicle security system according to claim 21 wherein said remote transmitter comprises a housing carrying said arm/disarm switch and said trunk release switches, and a transmitter carried by said housing and connected to said arm/disarm switch and said trunk release switch.

29. A method for operating a vehicle security system comprising a remote transmitter to be carried by a user and including at least one first switch for transmitting at least one first signal, and a second switch for transmitting a second signal; an audible indicator for sounding an audible indication; and a security controller switchable to one of an armed mode and a disarmed mode; the method comprising:

switching the security controller between one of the armed and disarmed modes responsive to receiving the at least one first signal and sounding the audible indication as confirmation thereof;

using the security controller to perform an auxiliary function responsive to receiving the second signal based upon the user operating the second switch continuously for greater than a predetermined time; and toggling the security controller to an opposite one of the armed and disarmed modes without sounding the audible indication responsive to receiving the second signal based upon the user operating the second switch a plurality of times in less than the predetermined time.

30. A method according to claim 29 wherein the at least one first switch comprises an arm switch for switching the security controller to the armed mode, and a disarm switch for switching the security controller to the disarmed mode.

31. A method according to claim 29 wherein the at least one first switch comprises an arm/disarm switch for toggling the security controller to an opposite one of the armed and disarmed modes.

32. A method according to claim 29 wherein the predetermined time is in a range of about two to three seconds.

33. A method according to claim 29 further comprising implementing a timeout delay after switching modes of the security controller before being able to again switch modes.

34. A method according to claim 33 wherein the timeout delay is in a range of about three to five seconds.

35. A method according to claim 29 wherein the vehicle includes a releasable trunk; and wherein the auxiliary function comprises release of the trunk.

36. A method according to claim 29 wherein the security system further comprises at least one security sensor for causing the security controller to generate an alarm when in the armed mode.

37. A method according to claim 29 wherein the vehicle comprises headlights; and further comprising using the security controller to operate the headlights responsive to switching between armed and disarmed modes.

38. A method according to claim 29 wherein the vehicle comprises door locks; and further comprising using the security controller operates the door locks responsive to switching between armed and disarmed modes.

39. A method according to claim 29 wherein the remote transmitter and the security controller use changing codes for increased security.

* * * * *